Aug. 6, 1946.　　　　E. H. KRAINER　　　　2,405,434
BROACHING MACHINE
Filed Aug. 2, 1944　　　　2 Sheets-Sheet 1
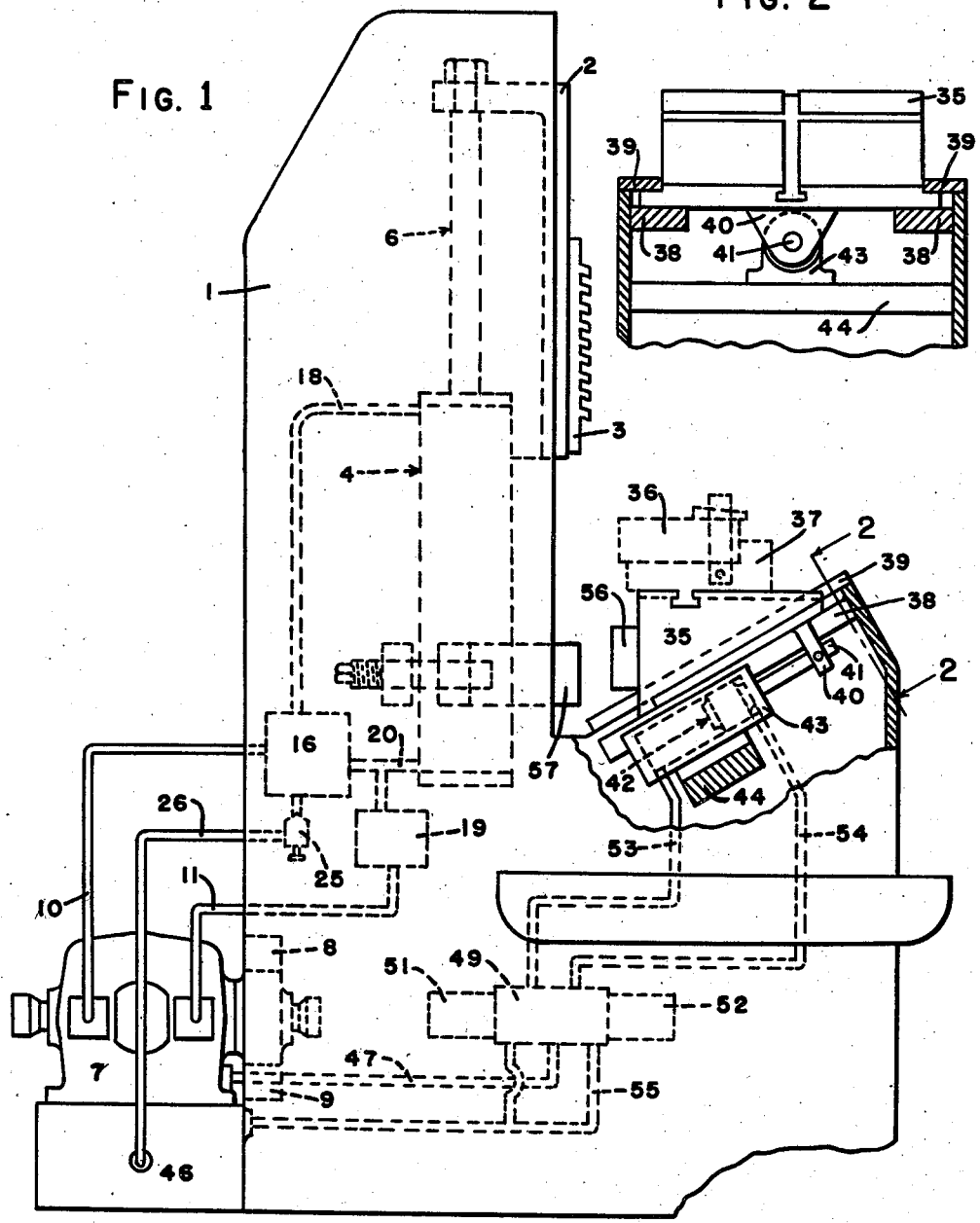
INVENTOR
EDGAR H. KRAINER
BY
ATTORNEY

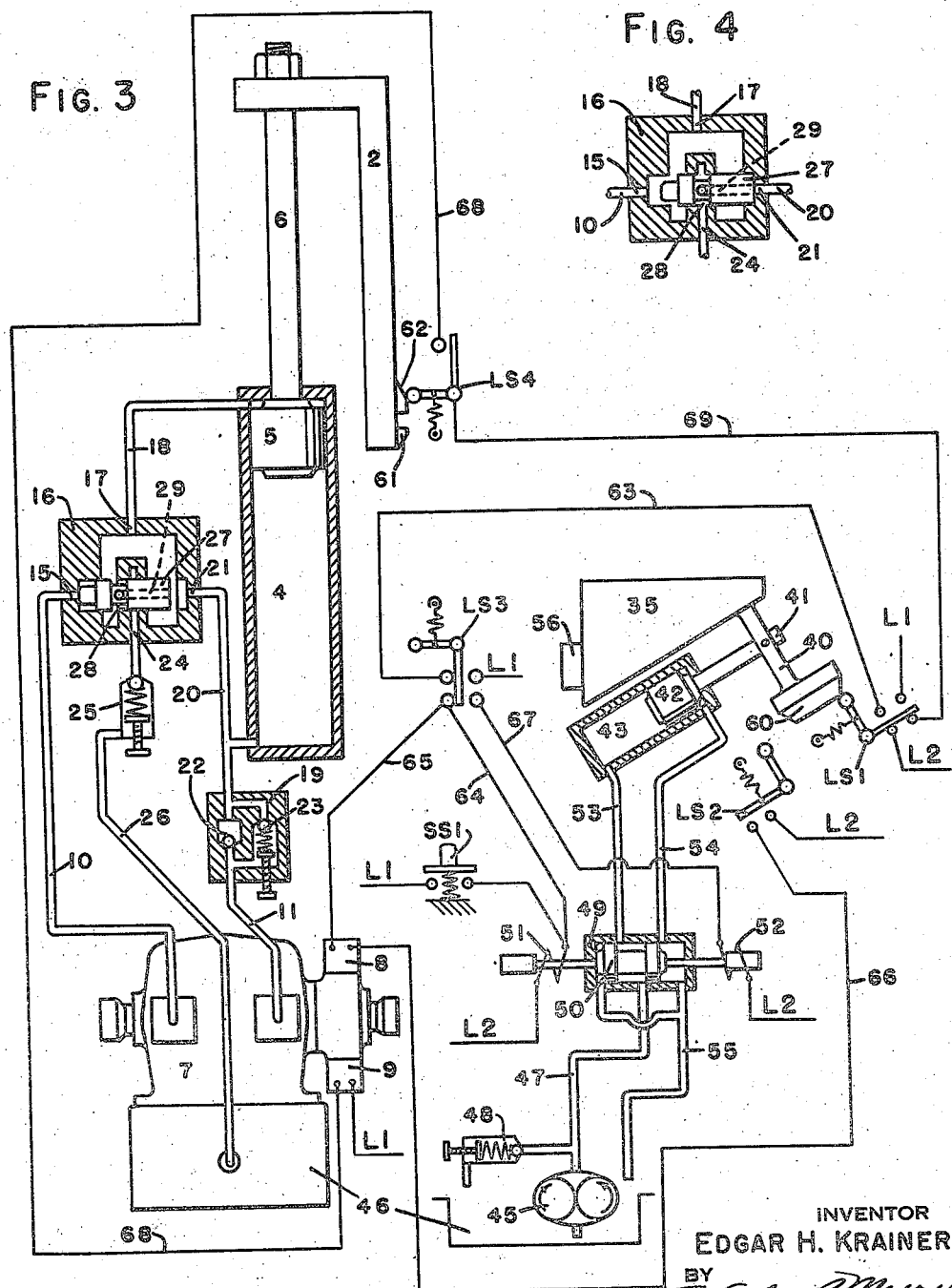

Patented Aug. 6, 1946

2,405,434

UNITED STATES PATENT OFFICE 2,405,434

BROACHING MACHINE

Edgar H. Krainer, Milwaukee, Wis., assignor to The Oilgear Company, Milwaukee, Wis., a corporation of Wisconsin Application August 2, 1944, Serial No. 547,693

4 Claims. (Cl. 90—33)

This invention relates to surface broaching machines of the type having a tool carriage which carries a broaching tool and is reciprocated along a fixed path, a work carriage which carries the work to be broached and is reciprocated along a fixed path toward and from the path of the tool, and means for reciprocating the two carriages alternately in such a manner that the tool will take a cut from the work during movement of the tool carriage in one direction and the work carriage will retract the work out of the path of the tool before the tool carriage moves in the opposite direction, such as the broaching machine shown in Patent No. 2,190,642.

In machines of this type the force required to broach the work is resolved into an axial component which tends to move the work in the direction of movement of the tool and a lateral component which tends to move the work out of engagement with the tool. That is, the axial component presses the work carriage against its support and the lateral component tends to move the work carriage along its support away from the path of the tool.

In the machine shown in Patent No. 2,190,642 the work carriage is advanced into and retracted from its broaching position by a hydraulic motor acting through a lever and linkage system. The work carriage is advanced into broaching position and then the levers go to dead center and positively lock the carriage in that position. The machine is highly successful and in extensive commercial use but under extreme conditions the lateral component of the broaching force is so great that it causes the lever and linkage system to yield and the work carriage to move a few tenths of a thousandth of an inch from its exact broaching position so that the finished work is not absolutely accurate.

In order to prevent the work carriage from backing up under any and all conditions, a machine similar to the machine shown in Patent No. 2,190,642 is provided with an abutment for locating the work carriage in its exact broaching position, the carriage engages the abutment while one of the joints in the lever mechanism is still a considerable distance from its dead center position and then the lever mechanism is moved to dead center position and presses the carriage against the abutment with a force which is greater than the lateral component of the broaching force. That is, the carriage is preloaded in a direction opposite to the direction of the lateral component of the broaching force. This arrangement is satisfactory but it requires a more powerful work carriage motor and larger and heavier parts in order to initially stress the machine structure.

The present invention has as an object to greatly reduce or eliminate entirely the tendency of the work carriage to move away from the tool during the broaching operation.

According to the invention in a general aspect, the work carriage is mounted upon a support which is inclined toward the path of the broaching tool.

The invention is exemplified by the broaching machine shown somewhat schematically in the accompanying drawings in which the views are as follows:

Fig. 1 is a side view of the machine with a part of one side broken away to expose the interior parts.

Fig. 2 is a section taken on a line 2—2 of Fig. 1 but with the work and work fixture omitted.

Fig. 3 is a diagram of hydraulic and electric circuits which may be employed for operating and controlling the machine.

Fig. 4 is a view showing a differential valve in a position different from that shown in Fig. 3.

For the purpose of illustration, the invention has been shown incorporated in a vertical broaching machine having a single tool carriage but it may as readily be incorporated in horizontal or other machines and in machines having a plurality of tool carriages.

The machine chosen for illustration had its mechanism carried by frame 1 which is of ordinary construction and provided with vertical ways (not shown) in which a tool slide or carriage 2 is mounted for vertical reciprocation.

Carriage 2 has a broaching tool 3 fixed upon its outer face and it is adapted to be reciprocated vertically by a hydraulic motor having its cylinder 4 rigidly secured within frame 1 and its piston 5 connected by a rod 6 to the upper end of carriage 2.

Liquid for operating motor 45 may be supplied from any suitable source but for the purpose of illustration the machine has been shown provided with a reversible variable delivery pump 7 which may be of the type illustrated in Patent No. 2,074,068 and provided with a control of the type shown schematically in Patent No. 2,190,642. It is deemed sufficient to state herein that pump 7 is controlled by two solenoids 8 and 9, that when solenoid 8 is energized the pump will discharge liquid into a channel 10, that when solenoid 9 is energized the pump will discharge liquid into a channel 11, and that when both solenoids are deenergized the pump will be at zero stroke and no liquid will be discharged thereby.

As shown, channel 10 is connected to a port 15 of a differential valve 16 which has a second port 17 connected by a channel 18 to the upper end of cylinder 4. Channel 11 is connected through a foot valve 19 to a channel 20 which is connected to the lower end of the cylinder 4 and to a port 21 of differential valve 16.

Foot valve 19 includes a check valve 22 and a resistance valve 23 which open in opposite directions. Check valve 22 permits liquid to flow freely from channel 11 to channel 20 but prevents flow in the opposite direction except through resistance valve 23 which opens at a pressure slightly higher than the pressure created in cylinder 4 by the weight of piston 5 and the parts connected thereto so that carriage 2 is prevented from descending when the machine is idle.

Differential valve 16 also has a port 24 formed therein and connected through a low pressure resistance valve 25 to a drain channel 26 which discharges into the sump of pump 7. Communication between the several ports of valve 16 is controlled by a valve member 27 which is fitted in a suitable bore and provided with a cannelure 28 and a duct 29 which extends from cannelure 28 through the interior of valve member 27 to the right end thereof, cannelure 28 being so located that it registers with port 24 when valve member 27 is in the position shown in Fig. 4.

The arrangement is such that, when pump 7 discharges liquid into channel 10, the liquid will flow through port 15 and move valve member 27 to the position shown in Fig. 4 and then it will flow through port 17 and channel 18 to the upper end of cylinder 4 and cause piston 5 to move carriage 2 downward on a working stroke and to eject liquid from cylinder 4 into channel 20. Enough of the ejected liquid to supply pump 7 will flow from channel 20 through resistance valve 23 and channel 11 to pump 7 and the remainder of the ejected liquid will flow from channel 20 through port 21, duct 29, cannelure 28, port 24, resistance valve 25 and channel 26 to the sump of pump 7, the pressure required to open resistance valve 25 being enough higher than the pressure required to open resistance valve 23 to assure an ample supply of liquid for pump 7.

When pump 7 is reversed and discharges liquid into channel 11, the weight of piston 5 and the parts connected thereto will cause pressure to rise and shift valve member 27 to the position shown in Fig. 3. Then the liquid discharged by pump 7 will enter the lower end of cylinder 4 and cause piston 5 to raise carriage 2 and the liquid ejected from the upper end of cylinder 4 by piston 5 will flow through channel 18, differential valve 16 and channel 20 to the lower end of cylinder 4 so that pump 7 need supply only a volume equal to the displacement of rod 6 and carriage 2 will be raised at high speed.

For the purpose of moving work into and out of position to be broached by tool 3, the machine is provided with a tool carriage 35 upon which the work is fastened as indicated in dotted lines which represent a work piece 36 rigidly secured upon the top of carriage 35 by a fixture 37. Carriage 35 is mounted upon an inclined surface of a support which is attached to or forms a part of frame 1. As shown, carriage 35 is slidably mounted upon a pair of ways 38 and prevented from tilting by a pair of gibs 39 which overlap the side portions of the carriage. Ways 38 are inclined downward toward the path of tool 3 to reduce or overcome entirely any tendency of the work to move away from the tool during a broaching operation as will presently be explained.

In machines of this type the work carriage is ordinarily reciprocated by a hydraulic motor through the medium of a lever mechanism and this arrangement is particularly advantageous in that the carriage is gradually accelerated and decelerated. It is also advantageous in a duplex machine for the reason that the lever mechanism enables a single motor to move the two work carriages in opposite directions simultaneously. For the sake of simplicity however, carriage 35 has been shown as having a lug 40 fixed to its underside and connected directly to the rod 41 of a piston 42 fitted in a cylinder 43 which is fixed in a stationary position as by being attached to a web 44 of frame 1.

Liquid for operating motor 42—43 is preferably supplied thereto from a source other than the source from which motor 4—5 is supplied. For example, liquid may be supplied to motor 42—43 by a gear pump 45 which has been shown as a separate pump but which is ordinarily driven in unison with pump 7 and arranged in the casing thereof according to the usual practice. Gear pump 45 draws liquid from a reservoir 46 and discharges it into a channel 47 having connected thereto a relief valve 48 through which liquid discharged by gear pump 45 in excess of requirements is exhausted and which enables gear pump 45 to supply liquid to motor 42—43 at a constant pressure.

The delivery of liquid from pump 45 to motor 42—43 is controlled by a valve 49 which preferably is of the spring centered type but which for the sake of simplicity has been shown as a simple 4-way valve having its valve member 50 connected to two solenoids 51 and 52 for moving it from one to the other of its two positions. Cylinder 43 has opposite ends thereof connected by two channels 53 and 54 to valve 49 at spaced apart points intermediate the ends thereof, channel 47 is connected to valve 49 at a point intermediate channels 53 and 54, and a drain channel 55 is connected to opposite ends of valve 49 and discharges into reservoir 46.

The arrangement is such that, when valve member 50 is in the position shown, liquid from gear pump 45 will flow through channel 47, valve 49 and channel 53 to the head end of cylinder 43 and cause piston 42 to move work carriage 35 outward to the position shown and hold it in that position until valve member 50 is shifted to its right hand position and then liquid from gear pump 45 will flow through channel 47, valve 49 and channel 54 to the rod end of cylinder 43 and cause piston 42 to move work carriage 35 inward to the limit of its movement and hold it in that position until valve member 50 is again shifted to its left hand position.

Inward movement of work carriage 35 is limited by a pair of abutments 56 thereon engaging a pair of adjustable stops 57 which are carried by frame 1 and arranged upon opposite sides of tool carriage 2 so that it can pass between them. Stops 57 are adapted to be so adjusted that they will stop carriage 35 when the work is in the correct position to be broached by tool 3.

After the work has been rigidly secured in position upon carriage 35, motor 42—43 advances carriage 35 until abutments 56 engage stops 57 and then motor 4—5 advances carriage 2 to cause tool 3 to broach the work. It has been previously explained that the work is ordinarily of such a nature that the broaching force is resolved into a vertical component or cutting force and a horizontal component or push off force which tends to move the work out of engagement with the tool.

When the tool takes a cut solely from a surface which is normal to the path of the tool such as by taking a cut across the end of the work to form a substantially flat surface thereon, the push-off force is approximately equal to and sometimes greater than the cutting force. If the work carriage support were normal to the path of the tool as in the previous machines, a hold-on force greater than the push-off force would be required to hold the work carriage firmly in engagement with its stops but with the work carriage support inclined downward toward the path of the tool as shown both the cutting force and the push-off force press the work carriage against its support and, if the support were inclined at an angle somewhat greater than 45°, the horizontal component of the cutting force would be greater than the push-off force and would hold the work carriage firmly against its stops so that no additional hold-on force would be required.

When the tool takes cuts solely from the sides of the work or from the sides of a recess in the end of the work, it does not tend to push the work outward. That is, the push-off force is zero and the cutting force is equal to the broaching force so that only a slight inclination of the work carriage support is necessary to cause the work carriage to be pressed firmly against its stops.

The above are extreme conditions and the work ordinarily broached upon machines of this type is of such a nature that each piece requires cuts to be taken both from the sides and end thereof or from the sides and end of a recess formed therein so that the push-off force is considerably less than the cutting force.

If a machine was only required to operate upon a single kind of work, its work carriage support could be arranged at such an angle that the horizontal component of the cutting force would be just enough greater than the push-off force to hold the work carriage firmly against its support but many different kinds of work are often broached upon the same machine.

Experience has shown that the push-off force on the average type of work is such that an inclination of from 25 degrees to 30 degrees of the work carriage support is sufficient to prevent the work from backing away from the tool. With the work carriage support arranged at such an angle, the force urging the work carriage against stops is not excessive when the push-off force is zero and only a relatively small additional force is necessary to hold the work carriage against its stops when the push-off force is equal to the cutting force. The additional hold-on force may be provided by the maintaining pressure in the work carriage motor or by operating the work carriage through a lever system which goes to dead center after the work carriage engages its stops.

The machine may be provided with any suitable control either manual, semi-automatic or automatic. As shown, it is provided with a simple electric control including a starting switch SS1, two limit switches LS1 and LS2 which are operated by an actuator 60 carried by work carriage 35 and two limit switches LS3 and LS4 which are operated, respectively, by two actuators 61 and 62 carried by tool carriage 2. The electric circuits are so simple that a description thereof is deemed unnecessary.

Operation

With the parts in the position shown, the machine is idle and tool carriage 2 is held up by liquid trapped in the lower end of cylinder 4 by resistance valve 23. When the pumps are started, gear pump 45 maintains pressure in cylinder 43 to hold work carriage 35 in its outer position.

After the work has been clamped upon carriage 35, the machine is started by closing switch SS1 which establishes a circuit from power line L1 through solenoid 51 to power line L2 to energize solenoid 51 which will shift valve member 50 to its right hand position, thereby causing motor 42—43 to be energized and move carriage 35 inward against stops 57 as previously explained.

As soon as carriage 35 starts to move, switch LS1 will close and establish a circuit (line L1—switch LS1—wire 63—switch LS3—wire 64—solenoid 51—line L2) to keep solenoid 51 energized.

Just as or before carriage 35 engages stops 57, actuator 60 closes switch LS2 to establish a circuit (line L1—wire 63—switch LS3—wire 65—solenoid 8—wire 66—switch LS2—line L2) to energize solenoid 8 which will cause pump 7 to go on stroke and liquid therefrom to flow to the upper end of cylinder 4 and cause piston 5 to move carriage 2 downward on a working stroke as previously explained.

As carriage 2 starts downward, switch LS4 will close but it will have no effect as the circuit controlled by it is open at switch LS1. Carriage 2 will continue downward and cause tool 3 to broach the work on carriage 35. The tool cannot push the work outward as carriage 35 is held firmly against its stops by the horizontal component with the cutting force, as previously explained, and by gear pump pressure acting upon piston 42.

After tool 3 has completed the broaching operation, actuator 61 will operate limit switch LS3 which will break the circuit through solenoid 8 to deenergize it so that pump 7 will go to zero stroke as previously explained, it will break the circuit through solenoid 51 to deenergize it and it will establish a circuit (line L1—wire 67—solenoid 52—line L2) to energize solenoid 52 which will shift valve member 50 to its left hand position to cause motor 42—43 to retract carriage 35 as previously explained.

As carriage 35 starts to retract, switch LS2 will open but it will have no effect as the circuit therethrough was broken by switch LS3. When carriage 35 reaches its outer position, actuator 60 will operate switch LS1 to establish a circuit (line L1—solenoid 9—wire 68—switch LS4—wire 69—switch LS1—line L2) to energize solenoid 9 which will cause pump 7 to go on stroke and liquid therefrom to flow to the lower end of cylinder 4 and cause piston 5 to raise carriage 2 as previously explained.

As carriage 2 starts upward, switch LS3 will operate and break the circuit through solenoid 52 to deenergize the same and it will close upon its other contacts but it cannot establish circuits through solenoids 8 and 51 as those circuits are open at switch LS1 and LS2 respectively. When carriage 2 reaches its upper position, actuator 62 will open switch LS4 to break the circuit through solenoid 9 which is thus deenergized and permits pump 7 to go to zero stroke. The machine will then be at rest with the parts in position to start another cycle of operations when switch SS1 is again closed.

The invention herein set forth is susceptible to various modifications and adaptations without departing from the scope of the invention which is hereby claimed as follows:

1. In a broaching machine having a broaching tool and means for moving said tool along a fixed path to enable it to take a cut from the surface of work extending into said path whereby the force exerted by said means upon said tool is resolved into an axial component which tends to move said work in the direction of movement of said tool and a lateral component which tends to move said work away from said tool, the combination of a stationary support arranged adjacent the path of said tool and having a surface inclined toward said path, a carriage movable upon said surface toward and from the path of said tool and adapted to carry the work to be broached, abutment means for limiting the movement of said carriage toward said tool and adjustable to stop said carriage in such a position that the work thereon is in the correct position to be broached, and hydraulic means for moving said carriage along said surface into and out of engagement with said abutment means, said surface being inclined in such a direction that both the axial and lateral components of said force press said carriage against said surface.

2. In a broaching machine having a broaching tool and means for moving said tool along a fixed path to enable it to take a cut from the surface of work extending into said path whereby the force exerted by said means upon said tool is resolved into an axial component which tends to move said work in the direction of movement of said tool and a lateral component which tends to move said work away from said tool, the combination of a stationary support arranged adjacent the path of said tool and having a surface inclined toward said path, a carriage movable upon said surface and adapted to carry the work to be broached, a stop for so locating said carriage that the work thereon is in position to be broached, and means for moving said carriage into and out of engagement with said stop and for holding said carriage against said stop while said work is being broached, said surface being inclined in such a direction that both the axial and lateral components of said force press said carriage against said surface.

3. In a broaching machine having a tool carriage, a surface broaching tool fixed to said carriage, a main hydraulic motor connected to said carriage, and a main pump for energizing said motor to enable it to reciprocate said carriage and cause said tool to broach work extending into the path of said tool, the force exerted by said tool upon said work being resolved into an axial component which tends to move said work in the direction of movement of said tool and a lateral component which tends to move said work away from said tool, the combination of a stationary support arranged adjacent the path of said tool and having a surface inclined toward said path, a work carriage movable upon said surface and adapted to carry the work to be broached, a second hydraulic motor for reciprocating said work carriage, an auxiliary pump for energizing said second motor, and means for controlling said second motor to cause it to move said work carriage along said surface to thereby move said work into and out of position to be broached, said surface being inclined in such a direction that both the axial and lateral components of said force press said carriage against said surface.

4. In a broaching machine having a tool carriage, a surface broaching tool fixed to said carriage, a main hydraulic motor connected to said carriage, and a main pump for energizing said motor to enable it to reciprocate said carriage and cause said tool to broach work extending into the path of said tool, the force exerted by said tool upon said work being resolved into an axial component, which tends to move said work in the direction of movement of said tool and a lateral component which tends to move said work away from said tool, the combination of a stationary support arranged adjacent the path of said tool and having a surface inclined toward said path, a work carriage movable upon said surface and adapted to carry the work to be broached, a stop for so locating said work carriage that the work thereon is in position to be broached, a second hydraulic motor for reciprocating said work carriage, an auxiliary pump for energizing said second motor, and means for controlling said second motor to cause it to move said work carriage along said surface into and out of engagement with said stop and for holding said work carriage against said stop while said work is being broached, said surface being inclined in such a direction that both the axial and lateral components of said force press said carriage against said surface.

EDGAR H. KRAINER.